(12) United States Patent
Reyes, Jr. et al.

(10) Patent No.: US 8,663,423 B2
(45) Date of Patent: Mar. 4, 2014

(54) AIRCRAFT ADHESIVE

(75) Inventors: Alfredo M. Reyes, Jr., North Hollywood, CA (US); John R. Short, Madison, AL (US); Santo Randazzo, Pomona, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/008,417

(22) Filed: Jan. 18, 2011

(65) Prior Publication Data

US 2011/0143028 A1  Jun. 16, 2011

Related U.S. Application Data

(63) Continuation of application No. 11/147,573, filed on Jun. 8, 2005, now Pat. No. 7,875,149.

(51) Int. Cl.
| | |
|---|---|
| *B29C 65/00* | (2006.01) |
| *B32B 37/00* | (2006.01) |
| *C04B 37/00* | (2006.01) |
| *C09J 163/00* | (2006.01) |
| *C08G 18/30* | (2006.01) |

(52) U.S. Cl.
USPC .......... 156/325; 156/300; 156/301; 156/330; 156/336; 528/60

(58) Field of Classification Search
USPC ............. 156/300, 301, 325, 330, 336; 528/60
See application file for complete search history.

(56) References Cited

U.S. PATENT DOCUMENTS

| 4,335,187 | A | * | 6/1982 | Rukavina et al. ............. 428/412 |
|---|---|---|---|---|
| 6,077,925 | A | * | 6/2000 | Gerard ............................ 528/60 |
| 6,423,810 | B1 | * | 7/2002 | Huang et al. ..................... 528/77 |
| 2003/0130413 | A1 | * | 7/2003 | Gruenewaelder et al. .... 524/589 |
| 2004/0005455 | A1 | * | 1/2004 | Stephenson et al. .... 428/355 EP |
| 2005/0112971 | A1 | * | 5/2005 | Panse ............................ 442/149 |

* cited by examiner

*Primary Examiner* — Michael Orlando
(74) *Attorney, Agent, or Firm* — Andrew C. Siminerio

(57) ABSTRACT

A method, composition, and article are disclosed relating to the formation of a hump seal on an aircraft transparency. The method includes applying to the aircraft transparency an adhesive composition having a Part A and a Part B. Part A includes a plasticizer, a cross-linking agent, and an adhesion promoter. Part B includes a moisture resister and an abrasion resister, with the adhesive composition being substantially sulfide free. In one example, the moisture resister includes polybutadiene. In another example, the adhesion promoter includes an epoxy silane.

9 Claims, No Drawings

AIRCRAFT ADHESIVE

CROSS-REFERENCE TO RELATED APPLICATION

This application is a continuation application of U.S. patent application Ser. No. 11/147,573, filed on Jun. 8, 2005, now U.S. Pat. No. 7,875,149, which is herein incorporated by reference in its entirety.

BACKGROUND OF THE INVENTION

1. Field of the Invention

The present invention relates to an aircraft adhesive useful as an aircraft hump seal and also to a method for applying an aircraft adhesive to an aircraft transparency, such as an aircraft window or windshield.

2. Technical Considerations

Aircraft windshields are as important to the structure of the fuselage as are the aluminum or composite panels that make up the rest of the pressurized aircraft vessel. Because they face forward, windshields must be able to protect the flight crew from impacts from birds and other objects, and they have to be sufficiently transparent and relatively free from optical distortion so as not to impair vision therethrough. Windshields, whether plastic and/or glass, typically are laminated structures formed by windshield panels bonded together by an interlayer. The number and shape of windshield panels depends on the requirements of the airframe designer. Generally, the outermost panel covers a windshield de-icing film that is electrically connected to a bus bar assembly. The interlayers between the panels are generally made of vinyl or urethane, or a mixture thereof. A delamination in the strict sense of the word is a failure of the interlayer between two panels. Delamination can be clear where panels separate or debond completely, or delamination can be cloudy when moisture creeps in between the panels. Delamination is only one example of undesirable things that can damage the windshields. Windshields can also be damaged by bubble formation, discoloration, electrical de-icing failure, scratches, moisture seal erosion, interlayer degradation and peel chipping.

Usually, the first step in an aircraft windshield failure is a loss of integrity of the moisture seals or "hump seals". Hump seals are formed over seams or interfaces between adjacent components, such as between the windshield and the adjacent metal framework. An aged or eroded hump seal often is the culprit. Moisture can seep into and corrode the urethane interlayer, which can lead to debonding at the glass/interlayer interface. If hump seal maintenance is not done, additional moisture can corrode the bus bar-to-deicing film junction interface. This corrosion can create microscopic breaks in the conductor path that can produce arcing and ultimately result in the fracture of the outboard glass panel. The appearance of delamination and/or discoloration in the edge of a windshield usually means that the hump seal is failing. If the seal is repaired immediately, the delamination can usually be stopped.

In aircraft manufacture and maintenance, the hump seals typically include an adhesive that blocks moisture vapor transmission to the susceptible interlayers between the glass or plastic plies. The adhesive also provides abrasion resistance to air, dust, and/or rain exposure. Typical adhesives used for hump seals in aircraft transparencies are polysulfide type or silicone-based adhesives having slow curing rates and poor low temperature properties.

Therefore, a need exists to provide an aircraft adhesive for aircraft transparencies, such as windshields and windows, that is fast curing and provides improved moisture vapor transmission blockage.

SUMMARY OF THE INVENTION

The present invention is a multi-component aircraft adhesive composition useful as an aircraft hump seal. The composition comprises two parts, Part A and Part B. Part A contains a plasticizer, a crosslinking agent, and an adhesion promoter. Part B contains a moisture resister and an abrasion resister, with the adhesive composition being substantially sulfide free.

The present invention also provides a method of forming a hump seal on an aircraft transparency. The method comprises applying to an aircraft transparency an adhesive composition comprising two parts, Part A and Part B. Part A contains a plasticizer, a crosslinking agent, and an adhesion promoter. Part B contains a moisture resister and an abrasion resister, with the adhesive composition being substantially sulfide free.

The present invention also provides a multi-component aircraft adhesive composition comprises a Part A and a Part B. The Part A comprises a Part A plasticizer comprising 6 weight % to 18 weight % of an alkyl benzyl phthalate and 16 weight ° A, to 29 weight % of a Part A phthalate ester; 0.01 weight % to 0.20 weight % of a polymeric fatty ester surfactant; 0.1 weight % to 4 weight % of silica; 40 weight % to 60 weight % of a crosslinking agent; and 8 weight % to 10 weight % of an adhesion promoter comprising a silane compound. The Part B comprises 4 weight % to 10 weight % of a polybutadiene; 4 weight % to 10 weight % a Part B plasticizer comprising of Part B phthalate ester; 0.01 weight % to 1 weight % of a hardener; and 25 weight % to 45 weight % of an abrasion resister.

The present invention also provides an aircraft adhesive comprising a plasticizer comprising 0.059 weight % to 2.1 weight % of an alkyl benzyl phthalate and 5.2 weight % to 39 weight % of a phthalate ester; up to 0.023 weight % of a polymeric fatty ester; up to 0.46 weight % of a silica; 4.0 weight ° A) to 6.9 weight % of a crosslinking agent; 0.79 weight % to 1.2 weight % of an adhesion promoter; 22 weight % to 40 weight % of a moisture resister comprising polybutadiene; up to 0.9 weight % of a hardener; 22 weight % to 40 weight % of an abrasion resister; and 4.9 weight % to 6.1 weight % of carbon black.

In non-limiting embodiments, the moisture resister can comprise polybutadiene and/or the adhesion promoter can comprise an epoxy silane.

The present invention is also directed to an aircraft transparency having a hump seal comprising the multi-component aircraft adhesive composition of the invention.

DETAILED DESCRIPTION OF THE INVENTION

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims are approximations that may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to include the beginning and ending range values and to encompass any and all sub-ranges subsumed therein. For example, a stated range of "1 to 10" should be considered to include any and all sub-ranges between (and inclusive of) the minimum value of 1 and the maximum value of 10; that is, all sub-ranges beginning with a minimum value of 1 or more and ending with a maximum value of 10 or less, e.g., 5.5 to 10, 3.7 to 6.4, or 1 to 7.8, just to illustrate a few. The term "charge" means to add to the mixture.

An aircraft adhesive according to the present invention generally comprises an accelerator component (Part A) and a base component (Part B). Each component can contain one or more of each of the following: plasticizers, surfactants, crosslinking agents, adhesion promoters, moisture resisters, hardening agents, polymers, abrasion resisters, fillers, catalysts, ultraviolet (UV) light and ozone blockers, desiccants, and desiccant-forming compounds. As discussed herein, one purpose of the aircraft adhesive of the invention is to cover the surface of an aircraft transparency and fill the gap between an aircraft transparency, such as a windshield, and the aircraft frame. The aircraft adhesive of the present invention creates a hump at the windshield airframe interface, typically referred to in the art as a "hump seal". The aircraft adhesive protects the transparency from harsh wind and water, and is sacrificial so that the glass and the frame of the aircraft are not abraded. Further, the adhesive in the present invention is "substantially sulfide free", meaning less than 5 wt % sulfide based upon the total weight of the composition, such as less than 4 wt %, such as less than 3 wt %, such as less than 2 wt %, such as less than 1 wt %, such as no intentional addition of sulfide material to the composition.

The present invention is useful as an adhesive for many types of aircraft, ranging from cargo planes to jets to helicopters, etc.

The aircraft adhesive according to the present invention can be formed from a multi-component system, e.g., Part A and Part B. Part A can be generally characterized as an accelerator and can contain one or more of each of the following: plasticizers, crosslinking agents and adhesion promoters. In one particular non-limiting embodiment, Part A contains one or more of each of the following: plasticizers, surfactants, UV and ozone resisters, expanders, crosslinkers and adhesion promoters.

Plasticizers for Part A include, but are not limited to, alkyl benzyl phthalate and phthalate ester. However, other plasticizers now known or heretofore developed can be used in combination with or in place of the alkyl benzyl phthalate and/or phthalate ester. Use of a linear or a branched-linear plasticizer is particularly useful because it provides for better low temperature properties, increased fogging resistance, and decreased crazing. By increased fogging resistance is meant that less cloudiness is imparted to the laminate due to moisture being adsorbed into and discoloring the laminate interlayer under typical operating environments, including high moisture conditions. Crazing is a term of art for stress cracking caused by the application of some sealants on polycarbonate or acrylics. The phthalate plasticizers of preference for the invention, as discussed above, have less aromaticity, thus, decreasing the attack on polycarbonate or acrylic surfaces that causes crazing.

Crosslinking agents for Part A can be selected from a variety of isocyanate compounds. In one non-limiting embodiment, methylene diisocyanate (MDI) in its polymeric form is used as it provides a strong reaction with a component of Part B that will be discussed further herein. Other crosslinking agents can be substituted for an isocyanate as long as it will react with a component of Part B.

Adhesion promoters for Part A can be selected from suitable silane compounds. In one non-limiting embodiment, epoxy silane is used as the adhesion promoter for Part A in order to provide for a polysulfide-free composition. An amino silane can be substituted for the epoxy silane.

An UV and ozone resister for Part A can be carbon black or colloidal carbon. However, aniline may also be used.

Expanders for Part A can be selected from any fumed silica product. Cabosil TS-720, commercially available from Cabot Corporation, is a non-limiting example of one suitable fumed silica for Part A.

Surfactants for Part A can be selected from any surface active agents now known or heretofore developed in the adhesive art. In one non-limiting embodiment, a polymeric fatty ester is used as the surfactant for the present invention.

Part B of the present invention is generally characterized as a base and generally contains one or more of each of the following: moisture resisters and abrasion resisters. In one particular non-limiting embodiment, Part B contains one or more of each of the following: moisture resisters, abrasion resisters, plasticizers, hardeners, reactors, fillers, UV and ozone resisters, adhesion promoters, desiccants, catalysts and strengtheners.

A non-limiting example of a suitable moisture resister for Part B is hydroxyl terminated polybutadiene. As discussed briefly below, the hydroxyl groups of the hydroxyl terminated polybutadiene can react with the isocyanate groups of the polymeric MDI of Part A to crosslink.

An exemplary abrasion resister for Part B is aluminum hydroxide. The aluminum hydroxide not only acts as an abrasion resister, but also as a filler and provides moisture resistance. However, any suitable abrasion resister now known or heretofore developed in the adhesive art may be used instead of or in addition to aluminum hydroxide.

Plasticizers for Part B include phthalate ester. However, other plasticizers now known or heretofore developed can be used in combination with or in place of the phthalate ester. As discussed above, use of the linear phthalate ester provides improved low temperature properties, increased fogging resistance, and no crazing.

An exemplary hardening agent for Part B is N,N Bis(2 hydroxypropyl) aniline. However, virtually any polyol can be used.

An exemplary reactor in Part B is 2-Oxepanone polymer with 2,2-bis (hydroxymethyl)-1,3-propanediol, which can react with the isocyanate of the Polymeric MDI of Part A. Another suitable reactor is an oligomeric diamine.

Fillers for Part B include calcium carbonate. However, any filler now known or heretofore developed in the adhesive art can be used in combination with or in place of the calcium carbonate.

An exemplary UV and ozone resister for Part B is carbon black or colloidal carbon. However, aniline can also be used.

An exemplary adhesion promoter for Part B is C12-C13 linear primary alcohol. Suitable alternatives include C7-C15 linear primary alcohols.

In one non-limiting embodiment of the present invention, Part B may also contain calcium hydroxide as a desiccant and calcium oxide as a desiccant promoter. The calcium oxide reacts with water present in the air to form additional calcium hydroxide. The desiccants absorb the carbon dioxide that is formed via the reaction of water and the isocyanates present in the adhesive. This absorption prevents foaming.

Catalysts for Part B include, but are not limited to, formic acid blocked tertiary amine and organometallics. The formic acid blocked tertiary amine is particularly useful because organometallics can cause reactions to go too fast. The formic acid blocked tertiary amine is easier and more predictable to control.

In one non-limiting embodiment, Part B can also include alkali metal aluminum silicate as a strengthener. However, suitable alternatives now known or heretofore developed in the adhesive art can be used.

In one non-limiting embodiment, the aircraft adhesive according to the present invention comprises two parts, Part A and Part B. Part A is generally characterized as an accelerator containing alkyl benzyl phthalate, polymeric fatty ester surfactant, carbon black, phthalate ester plasticizer, silica (e.g., Cabosil TS-720), polymeric MDI (methylene diisocyanate), and epoxy silane to a total weight of 100%. Part B is generally characterized as a base containing hydroxyl terminated polybutadiene, phthalate ester plasticizer, N,N Bis(2 hydroxypropyl) aniline, 2-oxepanone, polymer with 2,2-bis(hydroxymethyl)-1,3-propanediol, calcium carbonate, aluminum hydroxide, carbon black, C12-C13 linear primary alcohol, calcium oxide, calcium hydroxide, formic acid blocked tertiary amine, alkali metal aluminum silicate to a total weight of 100%.

In Part A, the alkyl benzyl phthalate functions as a plasticizer and can be added at a range from 2 wt % to 25 wt %, such as 6 to 18 wt %, e.g. 12.65 wt %. The polymeric fatty ester surfactant functions as a surfactant and can be added at a range from 0.01 to 0.20 wt %, such as 0.05 to 0.15 wt %, e.g. 0.10 wt % and mixed with the alkyl benzyl phthalate. The carbon black can be present at a range from 0.4 to 7 wt %, such as 2 to 6 wt %, e.g. 3.45 wt %, to provide UV and ozone resistance. The phthalate ester plasticizer functions as a plasticizer and can be present at a range from 10.5 to 40 wt %, such as 16 to 29 wt %, e.g. 22.65 wt. %. In one non-limiting embodiment of the invention (see Example 1, Table 1), the phthalate ester plasticizer is added in two parts to Part A, for example a first amount of phthalate ester plasticizer that ranges from 10 to 35 wt %, such as 15 to 25 wt %, e.g. 20.65 wt % of Part A and a second amount of phthalate ester plasticizer that ranges from 0.5 to 5 wt %, such as 1 to 4 wt %, e.g. 2 wt % of Part A. The silica (e.g. Cabosil TS-720) functions as an expander and can be present at a range from 0.1 to 4 wt %, such as 1 to 3 wt %, e.g. 2.15 wt %. Phthalate ester plasticizer can be present at a range. The polymeric MDI (methyl diisocyanate) can be present at a range from 40 to 60 wt %, such as 45 to 55 wt %, e.g. 50 wt %. The polymeric MDI reacts with the base and is used as a cross-linker with the hydroxyl terminated polybutadiene of Part B (described below). The epoxy silane can be present at a range from 8 to 10 wt %, such as 8.5 to 9.5 wt %, e.g. 9 wt %. The epoxy silane functions as an adhesion promoter. With Part A having a total wt % of 100, a lab check of the above particular non-limiting embodiment of Part A should indicate approximately 13.0 to 14.0% free isocyanate, with a viscosity of approximately 15 to 25 centipoises.

In Part B, the hydroxyl terminated polybutadiene functions to provide moisture resistance to the aircraft adhesive and can be present at a range from 25 to 45 wt %, such as 30 to 40 wt %, e.g. 33.97 wt %. The hydroxyl groups of the hydroxyl terminated polybutadiene can react with the isocyanate of the polymeric MDI of Part A to crosslink. Phthalate ester plasticizer, which functions as a plasticizer, can be present at a range from 1 to 15 wt %, such as 4 to 10 wt %, e.g. 6.80 wt %. The N,N Bis(2 hydroxypropyl) aniline functions as a hardener and can be present at a range from 0.01 to 1 wt %, such as 0.25 to 0.75 wt %, e.g. 0.34 wt %. 2-oxepanone, polymer with 2,2-bis(hydroxymethyl)-1,3-propanediol can be present at from 0.01 to 2 wt %, such as 0.5 to 1.5 wt %, such as at 1.01 wt %. The 2-oxepanone, polymer with 2,2-bis(hydroxymethyl)-1,3-propanediol is present to also react with the isocyanate groups of the polymeric MDI of Part A. The calcium carbonate, which functions as a filler, can be present at a range from 7 to 27 wt %, such as 15 to 20 wt %, e.g. 17 wt %. Aluminum hydroxide, which functions as an abrasion and moisture resister, can be present at a range from 25 to 45 wt %, such as 30 to 40 wt %, e.g. 33.97 wt %. Carbon black functions as a UV and ozone resister and can be present at a range from 0.5 to 6 wt %, such as 2 to 5 wt %, e.g. 3.40 wt %. C12-C13 linear primary alcohol can be added at from 0.05 to 0.50 wt %, such as 0.20 to 0.30 wt %, such as at 0.25 wt %. The function of the alcohol is to promote adhesion. The calcium oxide can be present at a range from 0.01 to 1.00 wt %, such as 0.25 to 0.75 wt %, e.g. 0.51 wt %. The function of the calcium oxide is to react with water to become calcium hydroxide, a desiccant. More calcium hydroxide, which functions as a desiccant can be added at a range from 0.01 to 2 wt %, such as 0.50 to 1.50 wt %, e.g. 1.02 wt %. The formic acid blocked tertiary amine (catalyst) can be present at a range from 0.01 to 0.05 wt %, such as 0.02 to 0.04 wt %, e.g. 0.03 wt %. The alkali metal aluminum silicate can be present at a range from 0.01 to 3 wt %, such as 1.0 to 2.0 wt %, e.g. 1.70 wt %. Part B then has a total wt % of 100.

As discussed previously, Part A functions as an accelerator, and Part B functions as a base. In one non-limiting embodiment of the present invention, the two components are mixed at a ratio of Part B:Part A ranging from 100:11 to 100:13, e.g. Part B-100 to Part A-12 (that is, 100 parts by weight of B and 12 parts by weight of A meaning 10.7 wt. % of Part A (12/112=10.7%) and 89.3 wt. % of Part B (100/112=89.3%). The mixed components can then be vacuum degassed. However, if the isocyanate of Part A is increased, the amount of Part B will also need to be increased stoichiometrically.

To package, the resulting mixture can be filled in 2 oz. (59.1 cm$^3$), 6 oz. (177.4 cm$^3$) and 12 oz. (354.8 cm$^3$) cartridges and then frozen in dry ice or dry ice with mineral spirits at −70° C. (−94° F.) or lower, and stored at −62.2° C. (−80° F.). The shelf life of a premixed and frozen aircraft adhesive of the present invention is at least 30 days at −80° F. (−62.2° C.). The premixed and frozen material can be used by thawing in a 120° F. (48.8° C.) water bath for 5 to 6 minutes, or at ambient temperature for 30 minutes, and applied in a conventional manner, such as by using a Semco® gun commercially available from PPG Aerospace—PRC Desoto International. An injection style Semkit® package commercially available from PPG Aerospace—PRC Desoto International can also be used. This is a complete package assembly that stores, mixes, and applies sealant and is available in 2 oz. (59.1 cm$^3$) and 6 oz. (177.4 cm$^3$). A Semkit® package that contains Part A and Part B in separate compartments has a shelf-life of approximately 6 months at ambient temperatures.

To make flow adjustments, silica may be added to Part B (the base) if a reduced flow of Part B is desired. Hence, the addition of extra silica will then affect the flow of the entire aircraft adhesive when Parts A and B are mixed.

The aircraft adhesive of the present invention also exhibits desirable low temperature properties. For example, the aircraft adhesive may be applied to a substrate at approximately ⅛ of an inch thickness (0.32 cm), then put in a cold bath at −65° F. (−53.8° C.) for approximately 6 hours. The aircraft adhesive can then be bent to a desirable form. Most other aircraft adhesives would break at this cold temperature; the aircraft adhesive of the present invention will not.

As discussed herein, the purpose of aircraft adhesive is to fill the gap between an aircraft transparency, such as a windshield, and the aircraft frame. The aircraft adhesive of the present invention fills the gap and creates a hump seal spanning between the windshield and frame. The purpose of the aircraft adhesive is to seal the transparency from harsh wind and water. The aircraft adhesive is sacrificial so that the glass and the frame of the aircraft are not abraded. The present adhesive outperforms traditional polybutadienes and blocks moisture vapor transmission, hence preventing fogging, i.e. clouding of the windshield. The present adhesive matches or exceeds the abrasion resistance of currently used polysulfide-containing adhesives, and the present adhesive also provides for quick curing. The present adhesive is extremely hydrolytically resistant and stable. It does not degrade in the presence of water. A typical polyurethane-based adhesive would not allow such severe moisture exposure.

The following Example illustrates a specific adhesive incorporating features of the invention. However, it is to be understood that this is just one illustrative example of the adhesive and that the invention is not limited to the following specific Example.

EXAMPLE 1

As shown in Table 1, the components, amounts, and procedure for making Part A were as follows:

TABLE 1

PART A

|  | wt % | Procedure |
| --- | --- | --- |
| Alkyl Benzyl Phthalate | 12.65 | Charge. |
| Polymeric Fatty Ester Surfactant | 0.10 | Charge and mix. |
| Carbon Black | 3.45 | Charge and mix. |
| Phthalate Ester Plasticizer | 20.65 | Charge and mix. |
| Cabosil TS-720, Silica | 2.15 | Charge and mix with high speed. Check grind. |
| Phthalate Ester Plasticizer | 2.00 | Charge and mix. Pull vacuum for 10-15 minutes at −30 inches Hg (−101,571 Pa). |
| Polymeric MDI | 50.00 | Charge and mix slowly. |
| Epoxy Silane | 9.00 | Charge and mix slowly. Pull vacuum for 10-15 minutes at −30 inches Hg (−101,571 Pa), |
| Total Weight | 100.00 |  |

As shown in Table 2, the components, amounts, and procedure for making Part B were as follows:

TABLE 2

PART B

|  | wt % | Procedure |
| --- | --- | --- |
| Hydroxyl Terminated Polybutadiene | 33.97 | Charge. |
| Phthalate Ester Plasticizer | 6.80 | Charge. |
| N,N Bis (2 Hydroxypropyl) Aniline | 0.34 | Charge. |
| 2-Oxepanone, polymer with 2,2-bis (hydroxymethyl)-1,3-propanediol | 1.01 | Charge and mix. |
| Calcium Carbonate | 17.00 | Charge and mix. |
| Aluminum Hydroxide | 33.97 | Charge and mix. |
| Carbon Black | 3.40 | Charge and mix. Heat to 212-220° F. (100-104.4° C.) while pulling vacuum to remove moisture. Cool down to 75-85° F. (23.8-29.4° C.). |
| C12-C13 Linear Primary Alcohol | 0.25 | Charge and mix. |

TABLE 2-continued

PART B

|  | wt % | Procedure |
| --- | --- | --- |
| Calcium Oxide | 0.51 | Charge and mix. |
| Calcium Hydroxide | 1.02 | Charge and mix. |
| Formic Acid Blocked Tertiary Amine | 0.03 | Charge and mix. |
| Alkali Metal Aluminum Silicate | 1.70 | Charge and mix. Pull vacuum for 10-15 minutes at −30 inches Hg (−101,571 Pa). |
| Total Weight | 100.00 |  |

The above adhesive composition of the invention was tested under various conditions (as shown in Table 3) against a commercially available adhesive, PR-1425, a polysulfide-containing adhesive available from PPG Industries, Inc., Pittsburgh, Pa. A majority of the tests were conducted according to Aerospace Standard AS5127/1 Revision A. The Taber Abrasion Test was conducted according to ASTM D4060 and the Moisture Vapor Transmission (MVT) Test was conducted according to ASTM F1249. For the Cure Rate tests, the hardness reading standard "Rex A" was used, The higher the Rex A reading, the harder the material. Generally, a material of medium hardness has a Rex A reading of between 45-70. The Peel Tests measured the strength of the adhesion of the adhesive to the listed substrate. For PR-1425, the Peel Test was evaluated by manually pulling the adhesive from the substrate once it had cured for approximately seven days. If the adhesive was able to be pulled off, "Off" is listed as a result. If the adhesive remained, "OK" is listed as the result. For the composition of Example 1, a more specific evaluation was conducted wherein a machine pulled the adhesive from the substrate after curing for approximately seven days. The machine pulled on either a thin piece of fabric or aluminum foil that had been embedded on the surface of the adhesive. While pulling, the machine is able to quantify the pounds per inch weight of material (PIW), i.e. the pounds per linear inch (PLI) of weight strength needed to remove the adhesive from the substrate. The "(100)" indicates 100% cohesive strength or failure at the adhesive/substrate interface. 100% indicates that none of the substrate is visible after a Peel Test is performed, i.e. a portion of the adhesive remained adhered to the substrate. Thus, if 10% of the substrate is visible, a score of "90", meaning 90% cohesive strength, would be given. The Peel Test rows marked as 3% NaCl indicate that the adhesive/substrate combination was soaked in a 3% NaCl/$H_2O$ bath for approximately another seven days after the initial curing at 120° F. (48.8° C.) before evaluating the adhesion.

EXAMPLE 2

TABLE 3

|  | PR-1425 | EXAMPLE 1 |
| --- | --- | --- |
| PROPERTY |  |  |
| Slump, inches (cm) |  |  |
| Initial | 0.15 (.381) | 0.12 (.3048) |
| 30 minutes | 0.45 (1.143) | 0.10 (.254) |
| Application Life, grams/minute |  |  |
| 30 minutes | 45 | 37 |
| 60 minutes | 25 | 4 |
| Tack Free Time at 75° F. (24° C.), hours |  | 3 |

TABLE 3-continued

| | PR-1425 | EXAMPLE 1 |
|---|---|---|
| Cure Rate at 75° F. (24° C.), Rex A | | |
| 3 ½ hours | 0 | 33 |
| 24 hours | 53 | 61 |
| 7 days | 55 | 70 |
| Low Temp. Flex at −65° F. (−54° C.) | Passed | Passed |
| Taber Abrasion (H18, 1 kg), grams loss | | |
| After 1000 cycles | 1.3612 | 1.0751 |
| MVT, gm/m$^2$/day @ 100° F. (38° C.) | 22.28 | 6.17 |
| Crazing Test | | |
| Acrylic | Passed | Passed |
| Polycarbonate | Passed | Passed |
| Tensile Strength and Elongation, psi (%) | | |
| Dry | 512 (357) | 680 (160) |
| JRF (7 days @ 140° F. (60° C.)) | 208 (350) | 270 (120) |
| DI Water (7 days @ 140° F. (60° C.)) | 144 (217) | 690 (150) |
| Swell in De-ionized Water | | |
| 7 days @ 140° F. (60° C.), % | 23.38 | 114 |
| Weight Loss in De-ionized Water, % | | |
| 7 days @ 140° F. (60° C.) + 24 hours @ 120° F. (49° C.) Oven | 8.12 | 3.79 |
| Weight Loss in JRF, % | | |
| 7 days @ 140° F. (60° C.) + 24 hours @ 120° F. (49° C.) Oven | 8.12 | 14.71 |
| PEEL TESTS | | |
| Acrylic | | |
| Dry | Off | 28 PIW* (100) |
| 3% NaCl | Off | 27 PIW* (100) |
| Polycarbonate | | |
| Dry | Off | 20 PIW* (100) |
| 3% NaCl | Off | 28 PIW* (100) |
| Phenolic | | |
| Dry | OK | 28 PIW* (100) |
| 3% NaCl | OK | 28 PIW* (100) |
| Stainless Steel, unabraded | | |
| Dry | Off | Off |
| 3% NaCl | Off | Off |
| Soda-Lime-Silica Glass, Air Side | | |
| Dry | Off | 21 PIW* (100) |
| 3% NaCl | Off | 22 PIW* (100) |
| Herculite II ® Glass, Air Side | | |
| Dry | OK | 29 PIW* (100) |
| 3% NaCl | Off | 25 PIW* (100) |
| Nesatron ® Coated Glass, Coated Side | | |
| Dry | Off | Off |
| 3% NaCl | Off | Off |
| NESA ® Coated Glass, Coated Side | | |
| Dry | OK | Off |
| 3% NaCl | Off | Off |

*pounds per inch weight

The results shown in Table 3 demonstrate the following characteristics of the adhesive composition of Example 1, which incorporates features of the present invention, when compared to PR-1425: 1) Improved Taber abrasion; 2) A 3-fold reduction in moisture vapor transmission rate; 3) A viscosity range from very low to comparable to PR-1425; 4) Adhesion without primers to acrylics, polycarbonate, phenolic, Herculite II® Glass, and soda-lime-silica glass; 5) Good low temperature flexibility at −65° F. (−54° C.); 6) Lower weight loss in de-ionized water; and 7) Improved stiffness, as shown by a higher tensile reading under dry, JRF, and deionized water conditions.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A method of applying an aircraft adhesive to an aircraft transparency comprising:
   (a) providing a transparency;
   (b) providing a multi-component aircraft adhesive comprising a Part A and a Part B, wherein Part A comprises:
   a Part A plasticizer comprising 6 weight % to 18 weight % of an alkyl benzyl phthalate and 16 weight % to 29 weight % of a Part A phthalate ester,
   0.01 weight % to 0.20 weight % of a polymeric fatty ester surfactant,
   0.1 weight % to 4 weight % of silica,
   40 weight % to 60 weight % of a crosslinking agent and
   8 weight % to 10 weight % of an adhesion promoter comprising a silane compound; and
   wherein Part B comprises:
   25 weight % to 45 weight % of a polybutadiene,
   a Part B plasticizer comprising 4 weight % to 10 weight % of a second phthalate ester;
   0.01 weight % to 1 weight % of a hardener and
   25 weight % to 45 weight % of an abrasion resister;
   (c) mixing Part B and Part A, thereby forming a mixed aircraft adhesive; and
   (d) applying the mixed aircraft adhesive to the aircraft transparency.

2. The method according to claim 1 wherein Part B further comprises carbon black.

3. The method according to claim 1 wherein the crosslinking agent is MDI.

4. The method according to claim 1 wherein the polybutadiene is a hydroyzyl terminated polybutadiene.

5. The method according to claim 1 wherein the hardener is an aniline.

6. The method according to claim 1 wherein the abrasion resister is aluminum hydroxide.

7. The method according to claim 1 wherein the adhesion promoter is an epoxy silane.

8. The method according to claim 1 wherein Part A further comprises a UV and ozone resister.

9. The method according to claim 1 wherein Part B further comprises a UV and ozone resister.

* * * * *